United States Patent [19]
Allport

[11] 3,728,520
[45] Apr. 17, 1973

[54] CREDIT CARD SENSING APPARATUS
[75] Inventor: Davies Allport, La Jolla, Calif.
[73] Assignee: Cubic Corporation, San Diego, Calif.
[22] Filed: Nov. 10, 1971
[21] Appl. No.: 197,460

[52] U.S. Cl. .....235/61.11 J, 235/61.7 B, 340/149 A
[51] Int. Cl. ..........................G06k 7/02, H01h 35/24
[58] Field of Search ................235/61.11 A, 61.11 J, 235/61.11 R, 61.11 E, 201, 61.7 B; 250/219 D, 219 DC; 200/46; 340/149 A

[56] References Cited
UNITED STATES PATENTS 3,660,639   5/1972   Cassel ............................235/61.11 J
3,200,240   8/1965   Hammel .......................235/61.11 A

OTHER PUBLICATIONS

IBM Tech. Discl. Bull'n., "Fluid–Operated Sensing Device" by Jackowski et al., Vol. 8, No. 9, February 1966, pages 1233–1234.

Primary Examiner—Thomas A. Robinson
Attorney—Keith D. Beecher

[57] ABSTRACT

An improved sensing apparatus is provided for reading coded embossments on a credit card which represent the account number thereof, or other data. The apparatus is for use in a credit verification system. The sensing apparatus of the invention forms a component of the sales slip imprinter mechanism which is presently used in conjunction with credit card transactions, in order to provide a record of the transaction for billing purposes. The sensing apparatus of the invention includes a multiplicity of pneumatically actuated diaphragm switches which are operated in a pattern corresponding to the coded embossments on the credit card being sensed. The switches make selective electrical contact with a circuit board, and they cause binary coded decimal signals to be stored in a register which represent the account number of the card, or other relevant data, the signals being used in the system to verify the validity of the particular card; or for accounting purposes, or for storage of data for later use.

7 Claims, 7 Drawing Figures

PATENTED APR 17 1973

INVENTOR:
Davies Allport
Jerry and Beecher
By Keith D. Beecher
ATTORNEYS

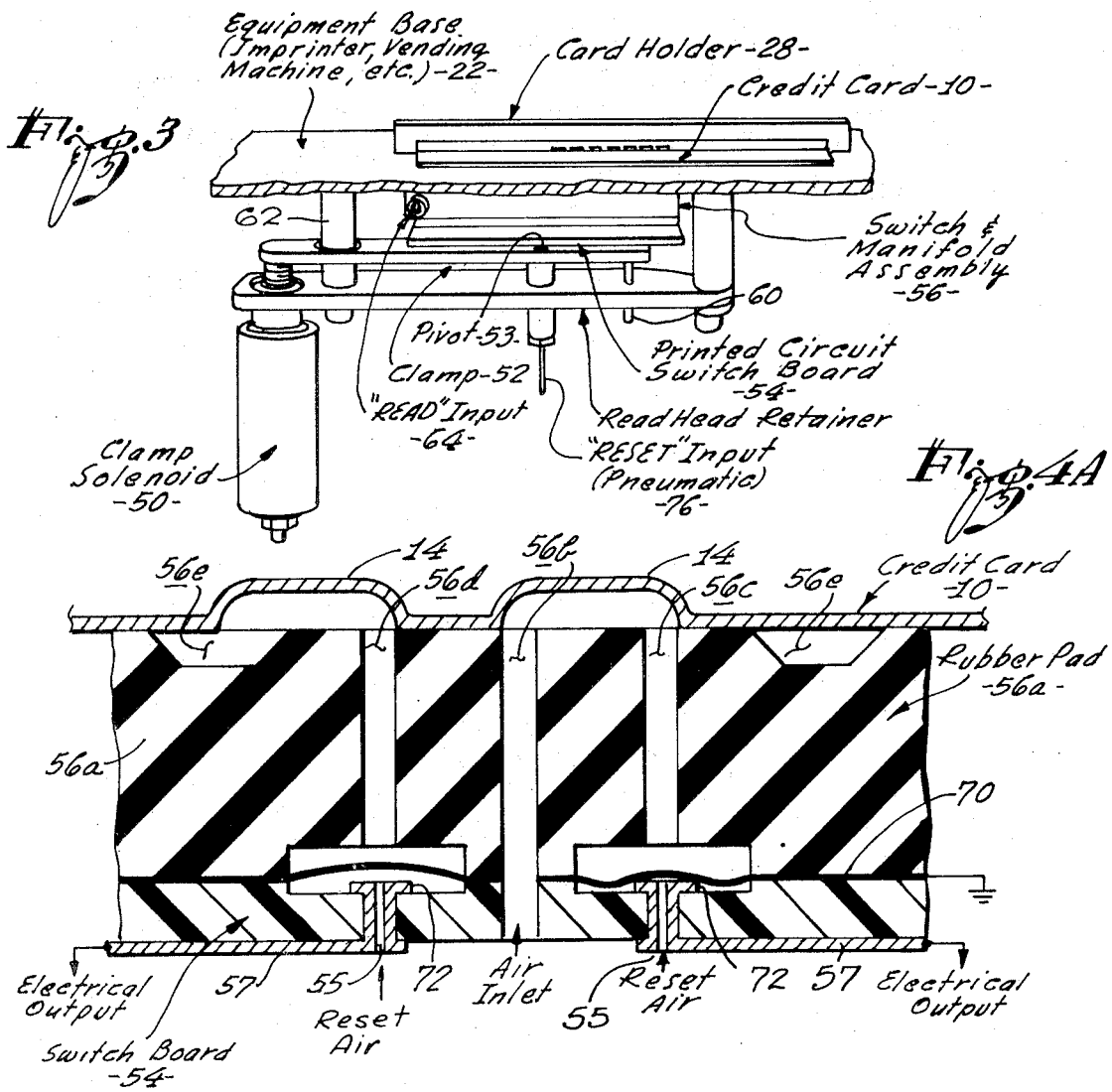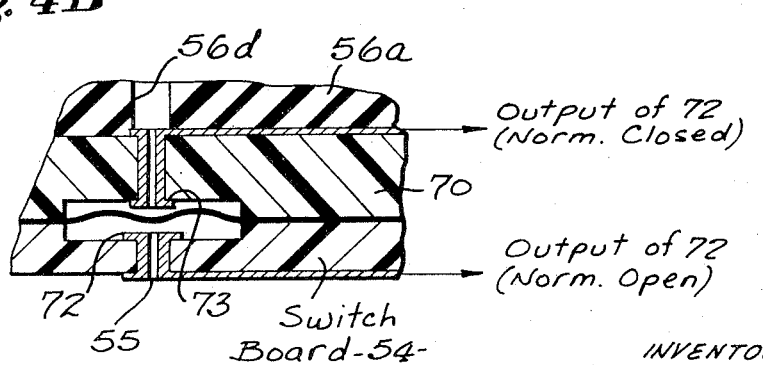

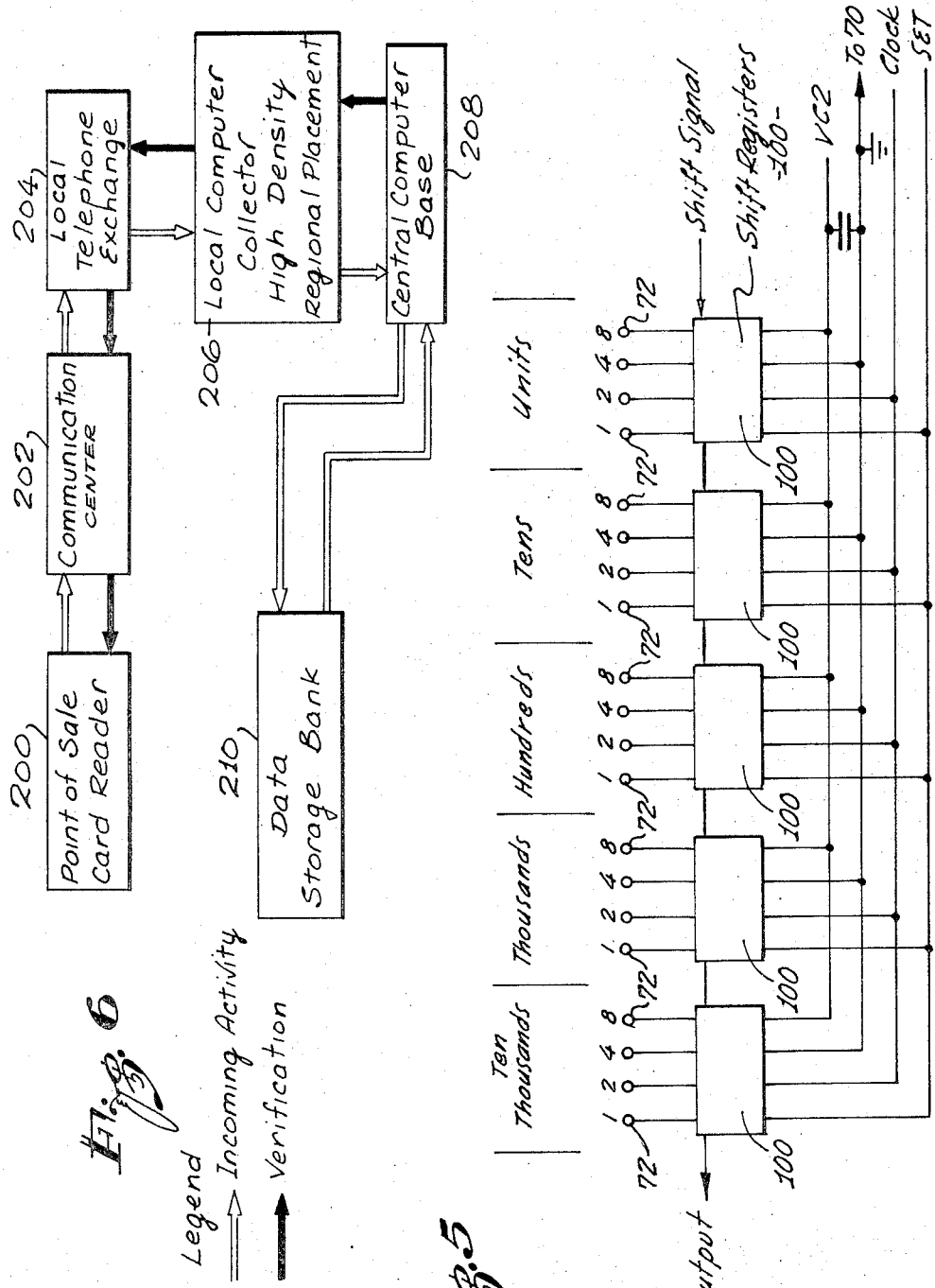

CREDIT CARD SENSING APPARATUS

BACKGROUND OF THE INVENTION

The use of credit cards has become almost universal throughout the world, and such cards are in general use on a local, national and international basis. Credit cards find particular use, for example, in gasoline service stations, car rental agencies, restaurants, airlines, department stores, hotels, and so on.

A problem which is becoming more serious year by year is the unauthorized use of stolen credit cards, or of cards which have been invalidated for one reason or another, such as, for example, in the case of a delinquent account. It is the usual practice for the companies issuing credit cards to send out lists of the invalid cards to the locations at which the credit card transactions take place. However, these lists are usually so voluminous that it is not feasible for the employee to check the number of each credit card presented against the lists.

Another approach is to make a phone call to the accounting or data storage area for the status of the particular account. Another prior art system requires the employee to punch the account number into a checking device. However, these latter approaches are also time-consuming and are subject to human error.

Many types of automatic verification systems have also been proposed in the prior art, whereby data processing means may be used to check the credit cards at each credit card transaction, and to determine whether or not the card is acceptable. One such verification system comprises the provision of apparatus at the various locations which sense coded indicia on the cards corresponding, for example, to the account number of the particular card. The resulting signals are then sent to a central processing station at which they are checked automatically against delinquent numbers. If a match is made, an appropriate signal is returned to the point of the transaction to indicate that the card is not acceptable.

A wide variety of various types of sensing apparatus have been proposed in the past, whereby coded perforations, magnetic strips or discs, or the like, on the individual cards are sensed, so that signals may be produced corresponding to the serial number of the particular card. The present invention provides an improved sensing apparatus which is operated pneumatically, and which senses coded embossments on the individual cards, to create and store electrical signals corresponding, for example, to the particular account number. These signals are then sent to the central storage bank, at which they are compared with delinquent numbers stored in the bank. If a match is achieved, and as mentioned above, a signal is returned to the transaction point to indicate that the card is not acceptable.

The sensing apparatus of the invention is intended to be used, for example, in conjunction with the usual sales slip printing units at the retail outlets, such as gasoline stations. Such printing units are in widespread present day use for recording the sales transaction. The card is placed on the printing unit, under the sales slip, invoice, or other record. The amount involved in the transaction may also be set into the printer and then a carriage is moved across the card. The carriage causes the information on the card to be printed on the sales slip, so that the purchaser may be identified, and the amount involved in the transaction may also be recorded.

In the embodiment of the invention to be described, the sensing apparatus of the invention is incorporated into such an imprinter, and the card is firmly held in place in its usual position under the sales slip. The card is provided with embossments corresponding to its account number, as is the case with many credit cards today. The embossments are read by pneumatic means in the sensing apparatus and the resulting electrical signals, corresponding to the account number of the card, are transmitted to the central station for comparison purposes. The imprinter is equipped, for example, with a green indicator light and a red indicator light. If the credit card is valid, the green indicator light will glow after a few seconds, and the imprinter is operated in the usual manner to record the transaction. If the verification shows the card to be invalid, a red indicator light glows, so that the necessary steps may then be taken, for example, to confiscate the card, after a further check has been made.

BRIEF DESCRIPTION OF THE DRAWINGS

FIG. 3 is a side elevation of various components of the sensing apparatus of the invention, which are incorporated into the imprinter of FIG. 2;

FIG. 4A is a somewhat schematic sectional representation of the various components which make up the sensing apparatus of FIG. 3, and showing the manner in which a membrane multi-switch assembly is pneumatically operated in accordance with the embossments on the credit card being sensed;

FIG. 4B is a representation, like FIG. 4A, but showing a modified construction;

FIG. 5 is a circuit representation of a register which is mounted on a circuit board in the assembly of FIGS. 3 and 4; and FIG. 6 is a block diagram of a typical system in which the apparatus of the invention may be incorporated.

DETAILED DESCRIPTION OF THE ILLUSTRATED EMBODIMENT

Figure 1:
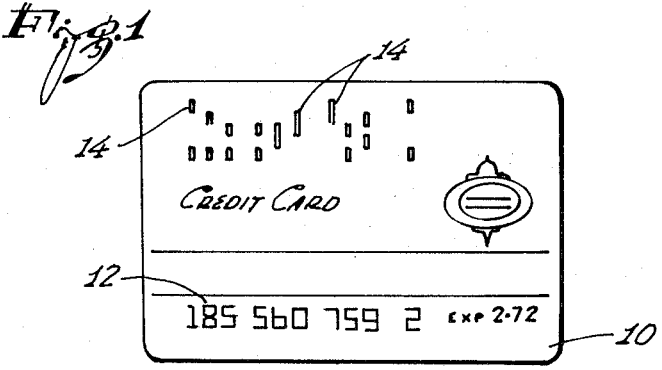
FIG. 1 is a representation of a typical credit card having embossments thereon corresponding to its account number.

The credit card shown in FIG. 1 is designated 10. This card may be a typical credit card in widespread use at the present time. The card is identified by a serial number 12, and the card also contains embossments 14 which are representative of its serial number, in accordance, for example, with a binary or other code. It is to be noted that the binary code embossments are located in an area of the card separated from the imprinting area so that the embossments may be read simultaneously with the printing operation.

Figure 2:
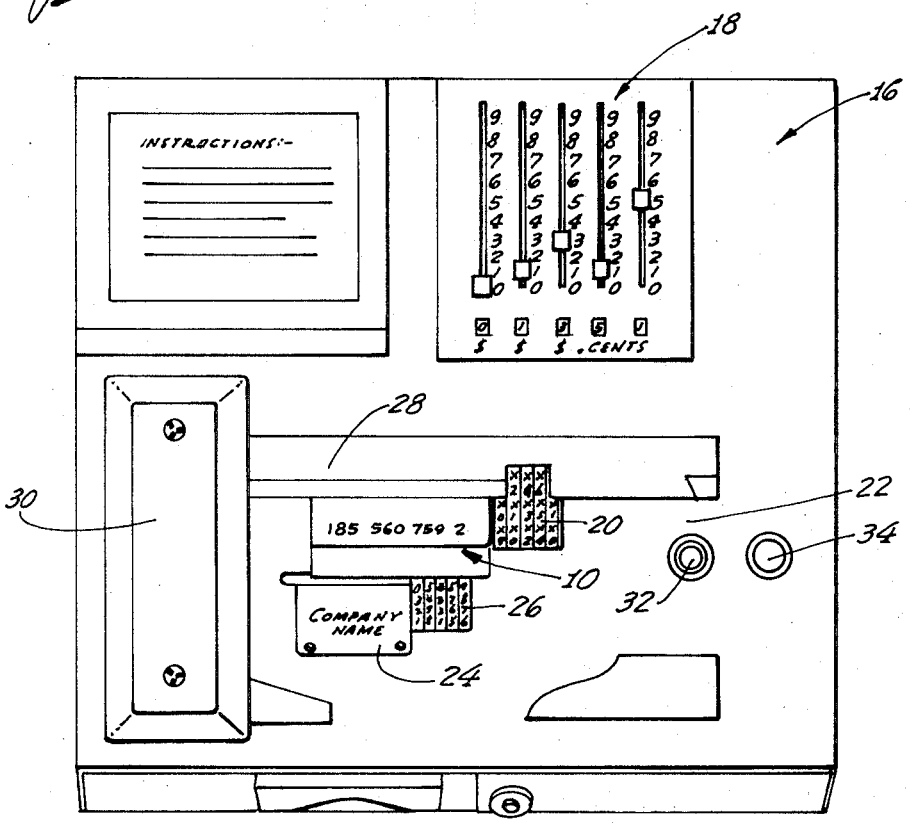
FIG. 2 is a top perspective view of a present day imprinter for transferring information from a typical credit card onto a sales slip or the like. The imprinter is modified in accordance with the invention to include the pneumatic sensing apparatus.

The mechanism illustrated in FIG. 2 is designated generally as 16, and the mechanism constitutes a typical printer in widespread use at service stations, and the like, for recording credit card transactions, the printer being modified to incorporate the sensing apparatus of the present invention. The imprinter 16 includes a series of levers which are moved to set to various numbers to designate the amount involved in a particular transaction. The setting of the levers 18 controls a corresponding set of printing wheels 20, which project through a supporting surface 22.

The upper portion of the credit card 10 is placed under a rail 28. The start switch of the system is then actuated to activate the read and transmit function. The sales slip, or other record, is then placed across the surface 22, over the lower portion of the card 10, and over a platen 24 which contains information concerning the particular retail outlet, and also over a further set of printing wheels 26 which are set, for example, to record the date.

The sensing apparatus of the invention senses the embossment 14 on the card 10, so that the account number may be transmitted to a central station for verification purposes. If the card is valid, a green light 32 glows, but if the card is not acceptable, a red light 34 glows. Only when the green light is on can the carriage 30 be moved across the surface 22 to record the transaction on the sales slip.

The sensing apparatus is shown in more detail in FIG. 3. As shown in FIG. 3, the credit card 10 is placed under the card holder rail 28 and over the surface 22. When the card is in place, a solenoid 50 is energized, and the solenoid engages a clamping lever 52 to cause it to bias a switch and manifold unit 56 at a pivot point 53 and through an opening in the base of the imprinter 22, and against the lower side of the card 10. In this way, the card is firmly held in place. The clamping lever 52 has one end supported by a threaded adjusting set screw 60, and the other end is slidable along a guide post 62.

FIG. 4A is a section of the switch and manifold unit 56 shown in FIG. 3. It consists of a resilient pad 56a formed of rubber-like material. Air under pressure is introduced to channels in the pad 56a through a "read" input 64. The air input passes into a series of transverse passages 56b in the pad 56a, and the pressurized air in the passages 56b is translated to a further transverse passage 56c only when an embossment in the card 10 bridges the top of a passage 56b and a passage 56c. Otherwise, the air is restricted from reaching a corresponding passage 56d. Instead, an embossed air channel is provided in the card 10 to vent the passage 56d to the atmosphere through passages 56e to prevent any build-up of pressure in the passage 56d.

A switch assembly in the form of an electrically conductive membrane 70 is mounted on the lower side of the pad 56a, and disposed across the ends of the transverse passages 56c and 56d. The electrically conductive membrane 70 may, for example, be composed of mylar having a conductive coating thereon, formed, for example, of gold. The membrane is connected to a reference potential point, such as ground.

Each individual portion of membrane 70 may be actuated to its down position, at which it engages a contact 72 on a printed circuit switch board 54, by the air input, when an embossment on the card intercouples the corresponding passages 56b and 56c. A pneumatic reset input 76 (FIG. 3) is provided, through which air under pressure is continuously introduced through passages 55 in the switch board 54, so as to hold all the membranes 70 normally in the up position shown to the left in FIG. 4 and out of engagement with the corresponding contact 72.

However, the input pressurized air introduced through the input 64 is of sufficient pressure to overcome the reset air, so that when a channel 56c is opened to the input channel 56b, such as shown to the right in FIG. 4, the membrane 70 is actuated to engage the corresponding contact 72. The membrane 70 is connected to a point of reference potential, such as ground, so that whenever a section of membrane 70 is actuated into engagement with a contact 72, that contact is effectively grounded.

The contacts 72 on the switch board 50 are connected, for example, to an integrated circuit shift register which is shown in circuit detail in FIG. 5, and which may be supported directly on the underside of the switch board 54. The integrated circuit includes a plurality of commercially available integrated circuit elements designated 100, and which are connected as shown, to constitute the various stages of the shift register. The various contacts 72 are connected to the different integrated circuits, and as the contacts 72 are selectively grounded by the actuation of the diaphragms 70 in accordance with the embossments on the card 10, the selective grounding of the contacts 72 effectively causes binary signals to be stored in the shift register. The binary signals represent, for example, a binary coded decimal code, so that the register may contain binary coded decimal signals representing the account number of the card.

The various integrated circuits are connected to the positive terminal of a source of unidirectional exciting potential designated VC2, and to a ground point, which is common with the membrane 70.

Upon an appropriate "set" command from the associated pressure switch, the card account number is read into the register. Then, a shift signal is applied to the right hand side of the register, and this causes the number to be read out in serial manner from the output, the shifting of the register being clocked by an appropriate clock signal.

The resulting signals are then sent from the card reader designated 200 in FIG. 6, to a communication center designated 202. From there, the signals are fed through the local telephone exchange 204 to a local computer collector 206. The local computer collector sends the information to a central computer base 208 which, in turn, checks the number against a series of numbers in its associated data storage bank 210. An indication as to whether or not the card is acceptable is then returned to the card reader in order to activate either the green light 32 or the red light 34 of FIG. 1.

The system of FIG. 6 represents but one possible system in which the card sensing apparatus of the present invention may be used. For example, negative air pressures may be used to actuate the switch diaphragm. Also, additional sets of switch contacts, such as the contact 73 (FIG. 4B), may be provided on a second switch board 55 on the top side of the membrane 70. The resulting double acting switching function may be used to enhance the reliability of the system.

The card sensing apparatus of the invention provides the imprinter 16 with a rapid verification as to the validity of the credit card being sensed. The apparatus is fast and accurate. The apparatus is made up of a relatively few and simple component parts, and may be installed easily and quickly.

The solenoid actuated lever clamp 52 clamps the inserted credit card 10 throughout the recording transaction, thereby assuring that the data supplied to the computer 208 of FIG. 6 is identical with the information imprinted on the invoice or sales slip. The switch contacts 72 and 73 may be formed of gold, or other appropriate material, and they are sealed, as shown in FIGS. 4A and 4B, against dust or moisture.

Solid state electronic components, such as the integrated circuits 100 of FIG. 5, are mounted directly on the switchboard 54 for maximum reliability and unitized construction. Low pressure air actuates and resets the switches 72 and 73, so as to read the embossments on the card 10.

An inexpensive, long life source of air may be used, since less than 1 cubic inch at 1 pound per square inch of air pressure is all that is required for each transaction. This means that no complex air filter system is required, and existing low cost air supplies may be used.

The sensing apparatus of the invention has universal utility, since it makes use of conventional credit cards of the embossed type. This means that there are no requirements for special inks, magnetic materials or laminations to be added to the card. Furthermore, the switch and manifold assembly may be configured to read the account number directly without the need for the coded embossments.

In the operation of the apparatus, the card, and as explained above, the card 10 is placed with its upper edge under the rail 28, so that the lower portion of the card is exposed so that its serial number may be imprinted on the sales slip. The low profile embossments on the card are positioned under the rail 28 and, when the solenoid 52 is energized, the resilient pad 56a is firmly held against the underside of the card 10, as shown in FIG. 4, so that the embossments may be read.

It will be appreciated, of course, that while particular embodiments of the invention have been shown and described, modifications may be made. It is intended in the following claims to cover all modifications which come within the spirit and scope of the invention.

What is claimed is:

1. Apparatus for sensing data indicia on a credit card, and the like, said data indicia appearing as embossments on the card, said apparatus including: a base having a first surface for supporting the card and having a plurality of passages extending therethrough to be selectively intercoupled by the embossments on the card; input means for introducing a pressurized fluid flow through a first group of said passages towards said first surface; an electrically conductive diaphragm mounted on a second surface of said base opposite said first surface across the ends of a second group of said passages, said diaphragm having portions to be individually actuated by a pressurized fluid flow towards said second surface through said second group of said passages selectively intercoupled to said first group of said passages by said embossments; and an electronic circuit board mounted on said second surface of said base and having electric contacts therein to be selectively engaged by said portions of said diaphragm when said portions are individually actuated from a first to a second position by said last-named pressurized fluid flow.

2. The apparatus defined in claim 1, and which includes reset means for introducing pressurized fluid to said portions of said diaphragm normally to maintain said portions in said first position, said pressurized fluid from said input means having sufficient pressure to overcome said pressurized fluid from said reset means.

3. The apparatus defined in claim 1, in which said base is composed of a resilient rubber-like material.

4. The apparatus defined in claim 3, and which includes a movable clamping member for supporting said base; and solenoid means engaging said clamping member selectively to cause said clamping member to move said base against a credit card inserted in said apparatus, so as to wedge said credit card in place.

5. The apparatus defined in claim 1, and which includes electronic circuitry mounted on said circuit board electrically connected to the aforesaid contacts.

6. The apparatus defined in claim 5, in which said electronic circuitry includes integrated circuits directly mounted on said circuit board.

7. The apparatus defined in claim 1, and which includes a second circuit board mounted on the other side of said diaphragm from said first-named board and having electric contacts thereon to be selectively engaged by said portions of said diaphragm when said portions are actuated from said second to said first position by said last-named pressurized fluid flow.

* * * * *